(12) United States Patent
Ehrhart et al.

(10) Patent No.: US 8,001,751 B2
(45) Date of Patent: Aug. 23, 2011

(54) METHOD FOR GRADUALLY RELIEVING PRESSURE IN A HYDRAULIC SYSTEM UTILIZING REVERSE FLUID FLOW THROUGH A PUMP OF THE SYSTEM

(75) Inventors: Philip J. Ehrhart, Narvon, PA (US); Robert L Fackler, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 828 days.

(21) Appl. No.: 11/901,167

(22) Filed: Sep. 14, 2007

(65) Prior Publication Data

US 2009/0071666 A1    Mar. 19, 2009

(51) Int. Cl.
*A01D 69/00* (2006.01)
(52) U.S. Cl. ............. 56/10.9; 60/468; 56/11.9; 56/15.6
(58) Field of Classification Search ............... 56/11.9, 56/15.8, DIG. 11, 15.6, 10.9; 60/327, 468; 91/432, DIG. 2
See application file for complete search history.

(56) References Cited

U.S. PATENT DOCUMENTS

| | | | | |
|---|---|---|---|---|
| 3,036,597 | A | 5/1962 | Frantz | 137/620 |
| 3,120,103 | A | 2/1964 | Beard | 60/52 |
| 3,338,441 | A * | 8/1967 | Flint | 414/635 |
| 3,404,605 | A | 10/1968 | Pfaff | 91/453 |
| 3,577,713 | A | 5/1971 | McCarty et al. | 56/11.9 |
| 3,738,430 | A * | 6/1973 | Livingston | 169/13 |
| 4,072,096 | A | 2/1978 | Phillips | 100/53 |
| 4,314,502 | A | 2/1982 | Brinkel et al. | 91/438 |
| 4,343,060 | A * | 8/1982 | Hildebrand et al. | 15/84 |
| 4,384,443 | A | 5/1983 | Hoogstrate | 56/11.9 |

(Continued)

FOREIGN PATENT DOCUMENTS

FR    2551805    9/1983

OTHER PUBLICATIONS

Pulsafeeder. Metering with ECO Gear Pumps [Brochure]. ECO Gearchem.*

*Primary Examiner* — Robert E Pezzuto
*Assistant Examiner* — Mai Nguyen
(74) *Attorney, Agent, or Firm* — Patrick M. Sheldrake; Michael G. Harms (57) ABSTRACT

A method of gradually relieving pressure in a hydraulic system of a work machine, wherein a pump in fluid communication with the hydraulic system and a fluid reservoir, is operable for pressurizing fluid from the reservoir and pumping the pressurized fluid into the hydraulic system, wherein the pump is restrictive to fluid flow therethrough when not operating, and the hydraulic system includes at least one valve in fluid communication with the work element configured for receiving the pressurized fluid. The valve is controllably operable in at least two operating modes, including a first mode wherein the pressurized fluid can pass therethrough between the pump and the work element or elements, and a second mode wherein the fluid is prevented from passing between the pump and the work element. The method includes operating the valve or valves in the first mode for at least a predetermined time period while the pump is not operating, to allow at least some of any of the pressurized fluid in the work element to flow through the hydraulic system and gradually drain through the pump to the reservoir so as to reduce any pressure in the hydraulic system and the work element.

20 Claims, 9 Drawing Sheets

U.S. PATENT DOCUMENTS

| | | | |
|---|---|---|---|
| 4,881,371 A | 11/1989 | Haeder et al. | 60/431 |
| 5,086,613 A | 2/1992 | Fox et al. | 56/10.9 |
| 5,136,846 A * | 8/1992 | Arii et al. | 60/468 |
| 5,332,053 A * | 7/1994 | Vachon | 180/53.4 |
| 5,398,506 A | 3/1995 | Martin | 60/433 |
| 5,493,860 A * | 2/1996 | Bjerke et al. | 60/327 |
| 6,336,325 B1 * | 1/2002 | Gluck et al. | 60/468 |
| 6,619,020 B1 | 9/2003 | Chaney et al. | 56/10.9 |
| 6,837,319 B2 * | 1/2005 | Dvorak et al. | 180/53.4 |
| 6,966,180 B2 * | 11/2005 | Deneir et al. | 60/327 |
| 2001/0054278 A1 * | 12/2001 | Rauch | 56/14.9 |
| 2006/0254239 A1 * | 11/2006 | Fackler et al. | 56/15.8 |
| 2007/0261403 A1 * | 11/2007 | Eppler | 60/468 |
| 2007/0295005 A1 * | 12/2007 | Fleischmann | 60/468 |

* cited by examiner

METHOD FOR GRADUALLY RELIEVING PRESSURE IN A HYDRAULIC SYSTEM UTILIZING REVERSE FLUID FLOW THROUGH A PUMP OF THE SYSTEM

FIELD OF THE INVENTION

The present invention relates to a method for relieving hydraulic fluid pressure in a hydraulic system pressurized utilizing a pump providing a highly restrictive flow path, such as, but not limited to, a gear pump, and, more particularly, to a method for gradually relieving pressure by reverse fluid flow through a flow restricting pump such as a gear pump of the system.

BACKGROUND OF THE INVENTION

Hydraulic systems including pumps providing a highly restrictive flow path when not operating, which can include, for instance, but which is not limited to, gear pumps, geroter pumps, vane pumps, and in some instances, piston pumps, are commonly used in a variety of applications, wherein work elements of the systems require pressurization to high pressures, for instance, 3000 psi, for performing work functions such as lifting heavy objects. One such application is the lift and flotation system of an agricultural harvesting machine of the type that requires lifting and supporting a relatively heavy and large header including apparatus for harvesting crops. An exemplary lift system is that of a windrower, although the present discussion is not limited to harvesters of that type, or to harvesters whatsoever.

Some hydraulic systems utilizing gear pumps and other pumps which provide very limited fluid flow capabilities when not operating remain pressurized after being shut down; often with no means to relieve pressure in the system except by the opening of a hydraulic fitting of the system. Also, when shut down, one or more of the work elements may be in a raised position, and further, may be supporting a heavy load. When service or maintenance of such a system is required, service personnel must exercise extreme caution when opening the system to prevent bodily injury and/or equipment damage. Additionally, when the system depressurized rapidly, the service personnel, and other personnel in the vicinity of the system, must beware of possible resultant movement of the work elements of the system and/or objects controlled or supported thereby. In regard to the exemplary lift system for the header of an agricultural harvester, often, the harvester is stopped with the header in an elevated or lifted position, and if system pressure is relieved rapidly, the header may be subject to rapid or abrupt downward movement or dropping. As another potential hazard, escaping high-pressure fluid may be hot, and have sufficient velocity to cause injury. As a result, it is desirable to have a manner of depressurizing a hydraulic system, to avoid the above hazards.

It is known to provide a capability to relieve hydraulic pressure in at least some hydraulic systems of a work machine such as a harvester, with the engine, and most machine controls, operating. It is also known to provide a bleed off valve, for instance, in connection with a hydraulic manifold, to allow manual bleeding off of hydraulic pressure. However, in many applications, the manifold is not in direct fluid communication with all pressurized regions of the hydraulic system, such as at least some versions of header lift and flotation system. There are also instances wherein it is desired to depressurize a hydraulic system of a work machine while the engine is not operating or operable, for instance, during service operations, or as a result of breakdown.

Thus, what is sought is a method of relieving high-pressure conditions in a hydraulic system pressurized by a pump which is highly flow restrictive when not operating, such as a gear pump, particularly, for a work machine such as an agricultural harvester such as a windrower, which avoids the possibility of injury and sudden lowering or dropping of heavy components, without requiring the engine of the machine to be operating.

SUMMARY OF THE DISCLOSURE

Accordingly, what is disclosed is a method of relieving high pressure conditions in a hydraulic system, particularly those of a work machine such as an agricultural windrower, which avoids the possibility of injury and sudden lowering or dropping of heavy components, such as, but not limited to, the header of a windrower, without requiring the engine or other driver of the pump to be operating.

According to a preferred method of the invention, pressure in a hydraulic system of a work machine is gradually relieved through a pump, provided for pressurizing fluid from a reservoir and pumping the pressurized fluid into the hydraulic system, but which, when not operating, serves as a highly restrictive fluid flow path. The hydraulic system includes at least one valve in fluid communication with at least one work element configured for receiving the pressurized fluid for raising the component or components, such as a header. The valve is controllably operable in at least two operating modes, including a first mode wherein the pressurized fluid can pass therethrough between the pump and the work element or elements, and a second mode wherein the fluid is prevented from passing between the pump and the work element or elements. The method includes operating the valve or valves in the first mode for at least a predetermined time period while the pump is not operating, to allow at least some of any of the pressurized fluid in the work element or elements to flow through the hydraulic system and gradually drain through the pump to the reservoir so as to reduce any pressure in the hydraulic system and the work element.

According to another preferred aspect of the invention, the at least one valve is automatically controlled by a programmable controller operable by an input command for initiating and controlling operation of the at least one valve for the predetermined time period.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3a is a schematic of hydraulic, mechanical and electrical subsystems of the system of FIGS. 1 and 2a.

DETAILED DESCRIPTION OF THE PREFERRED EMBODIMENTS

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter, of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

FIGS. 1, 2, 2a, 3, 3a, 4 and 5, show apparatus for use with the method of the present invention utilized in connection with a self-propelled windrower 10; however, it will be appreciated that the principles of the present invention are not limited to a self-propelled windrower, or to any specific type of harvesting machine, or other specific type of hydraulic system.

Figure 1:
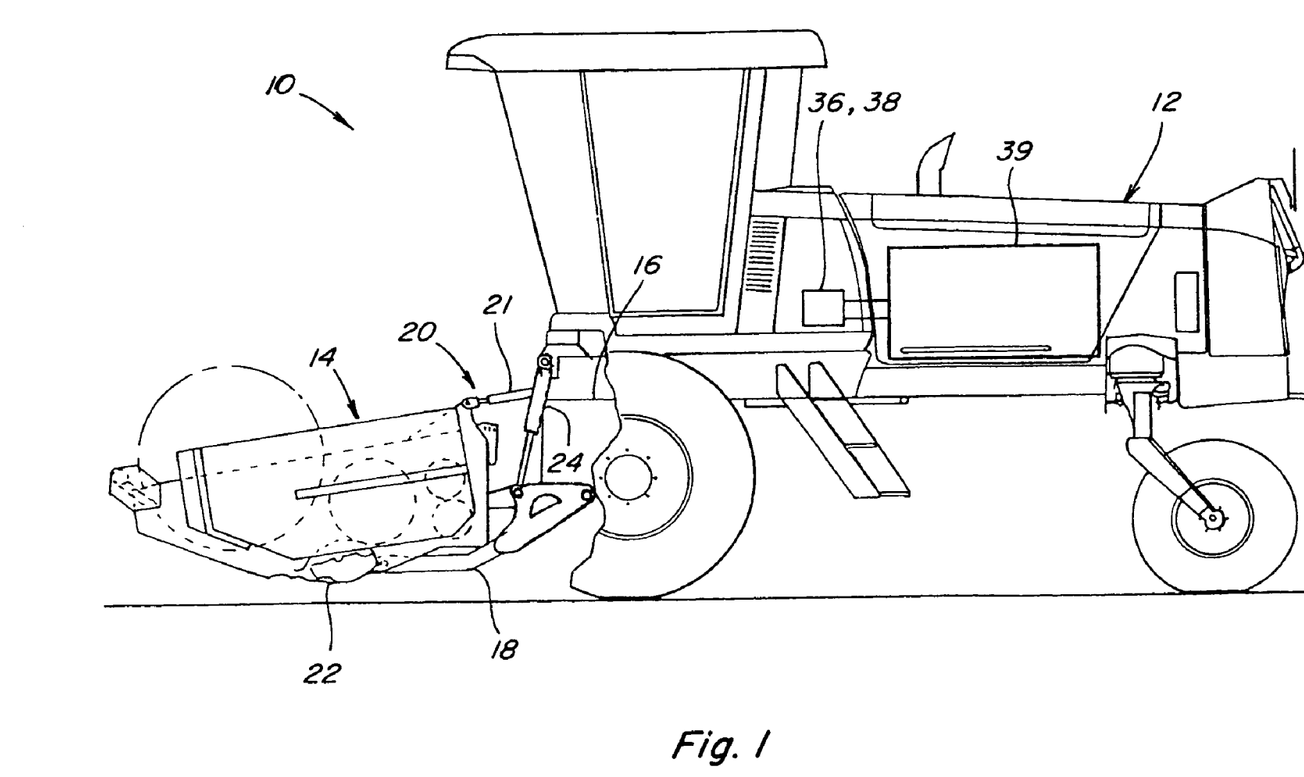
FIG. 1 is a partial side elevational view of a crop harvesting machine of the type with which the method of the invention may be used, also showing a simplified side view of elements of an exemplary lift and flotation hydraulic system with which the instant invention is used.

In the illustrated embodiment, the self-propelled windrower 10 comprises a tractor 12 and a header 14, the header 14 being attached to the front end of the frame 16 or chassis of the tractor 12. The header may be of generally any suitable construction and design, and may include not only crop-harvesting mechanisms, but also crop conditioners such as commonly used conditioner rolls. Such attachment of the header 14 to the frame 16 is achieved through a pair of lower arms 18 (only the left one being shown, the right being generally the same) pivoted at one end to the frame 16 and at the other end to the header 14, as well as through a central upper link 20. The link 20 may take the form of a single double-acting hydraulic cylinder 21 whose extension and retraction is controlled by the operator to remotely control the angle of sickle bar 22 on the lower front of the header 14.

A single lift/flotation cylinder 24, 26 interconnecting the lower arm 18 and the frame 16 supports each side of the header, i.e., each side of the header is supported by its own lift/flotation cylinder (again, only the left cylinder 24 being shown in FIG. 1).

The method of the present invention has utility for relieving pressure gradually in a hydraulic system otherwise used for managing and controlling the operation of the lift and flotation functions that control the lift/flotation cylinders. This can be done jointly for the cylinders on the opposite sides of the machine in the instance of a non-independent system, and separately, but simultaneously if desired, for the independent system. With regard to the application of the present invention to the independent system, the method of the invention can be utilized for relieving pressure simultaneously in the two separate or independent hydraulic systems, one for the right side lift/flotation cylinder and one for the left. An independent system is typically used to control cylinders 24 and 26 of windrower 10 to extend and retract by different extents, for effecting tilting of header 14 relative to tractor 12, in either sideward direction, to a desired extent. In actuality, the two systems may be totally separate, or they may share some operational components and a similar cylinder structure.

Figure 2:
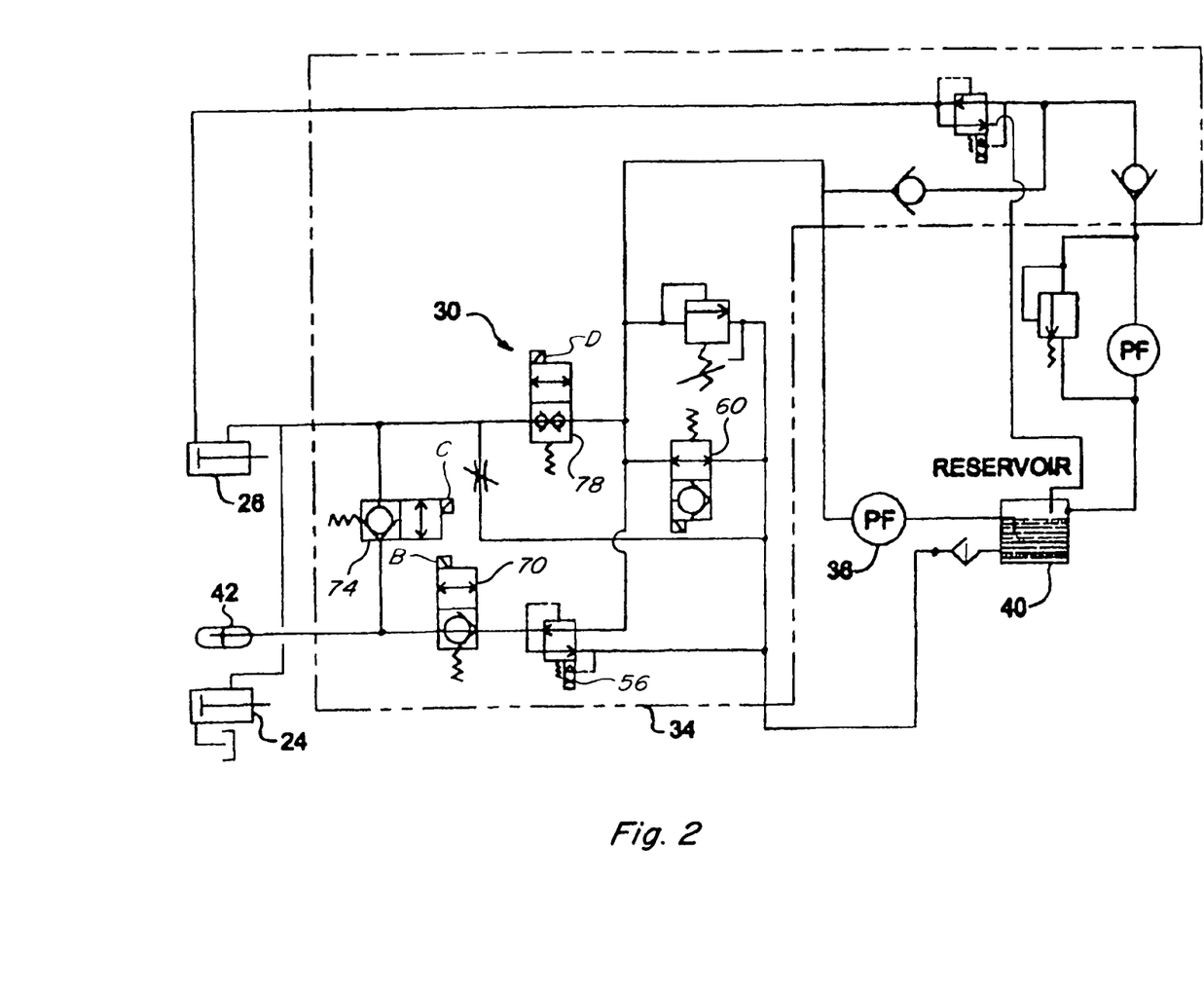
FIG. 2 is a hydraulic schematic view of one embodiment of a hydraulic system with which the instant invention can be used, which is an example of a non-independent system.
Figure 2A:
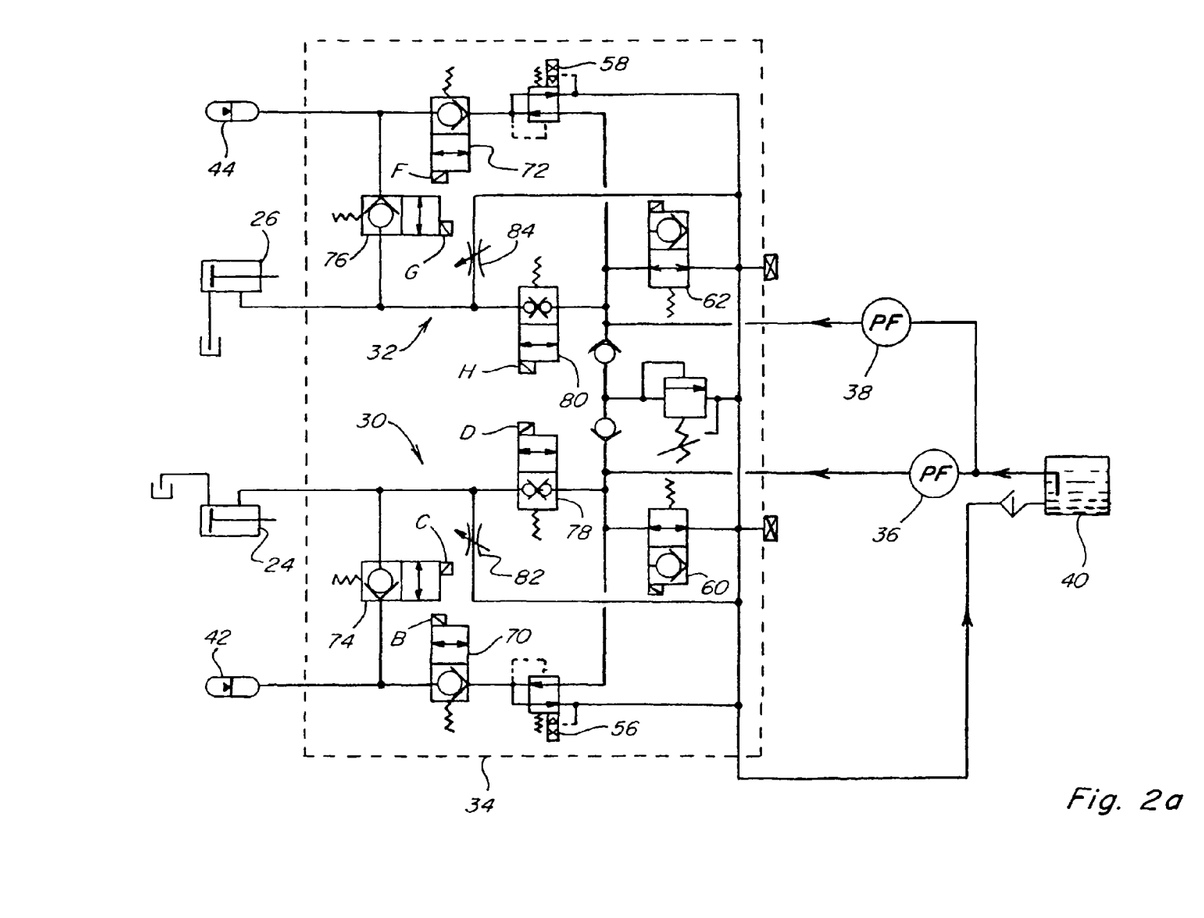
FIG. 2a is a hydraulic schematic view of another embodiment of a hydraulic system with which the instant invention can be used, which is an example of an independent system.

Directing attention now to FIG. 2, the hydraulic control system for left cylinder 24 and right cylinder 26 can be seen to include a single electro-hydraulic subsystem 30. This is representative of a non-independent system. In FIG. 2a, on the other hand, two basically similar electro-hydraulic subsystems 30 and 32 are used for controlling cylinders 24 and 26, respectively. This represents an independent system. For convenience of assembly and operation, in both instances, the majority of the components are housed in a single valve body 34 with appropriately located ports and other necessary connection devices and fixtures. Explaining the non-independent system of FIG. 2, a fixed displacement gear pump 36 moves the hydraulic fluid into subsystem 30 from reservoir 40, through the various circuits or fluid paths, as directed by control valves, to accumulator 42, to hydraulic cylinders 24 and 26 and back to reservoir 40 as appropriate. Explaining the independent system of FIG. 2a, a pair of fixed displacement gear pumps 36, 38 move the hydraulic fluid into respective subsystems 30, 32 from reservoir 40, through the various circuits as directed by control valves, to accumulators 42, 44, to hydraulic cylinders 24, 26 and back to reservoir 40 as appropriate. The gear pump or pumps 36, 38 is/are typically located in proximity to and driven by an engine 39 of tractor 12, and are connected to the subsystems 30, 32 via fluid lines in the well known manner.

Figure 3:
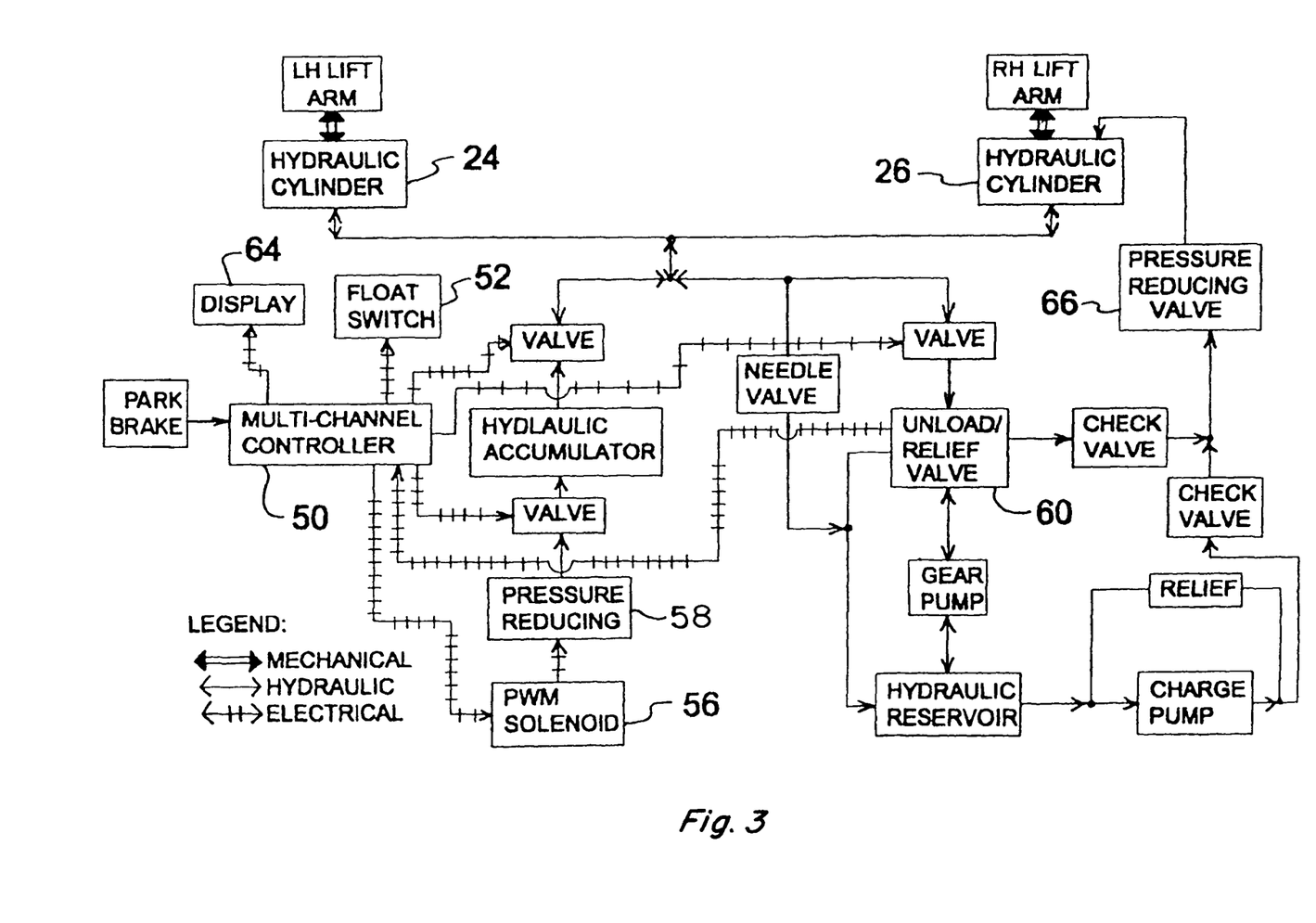
FIG. 3 is a schematic of hydraulic, mechanical and electrical subsystems of the system of FIGS. 1 and 2.
Figure 3A:
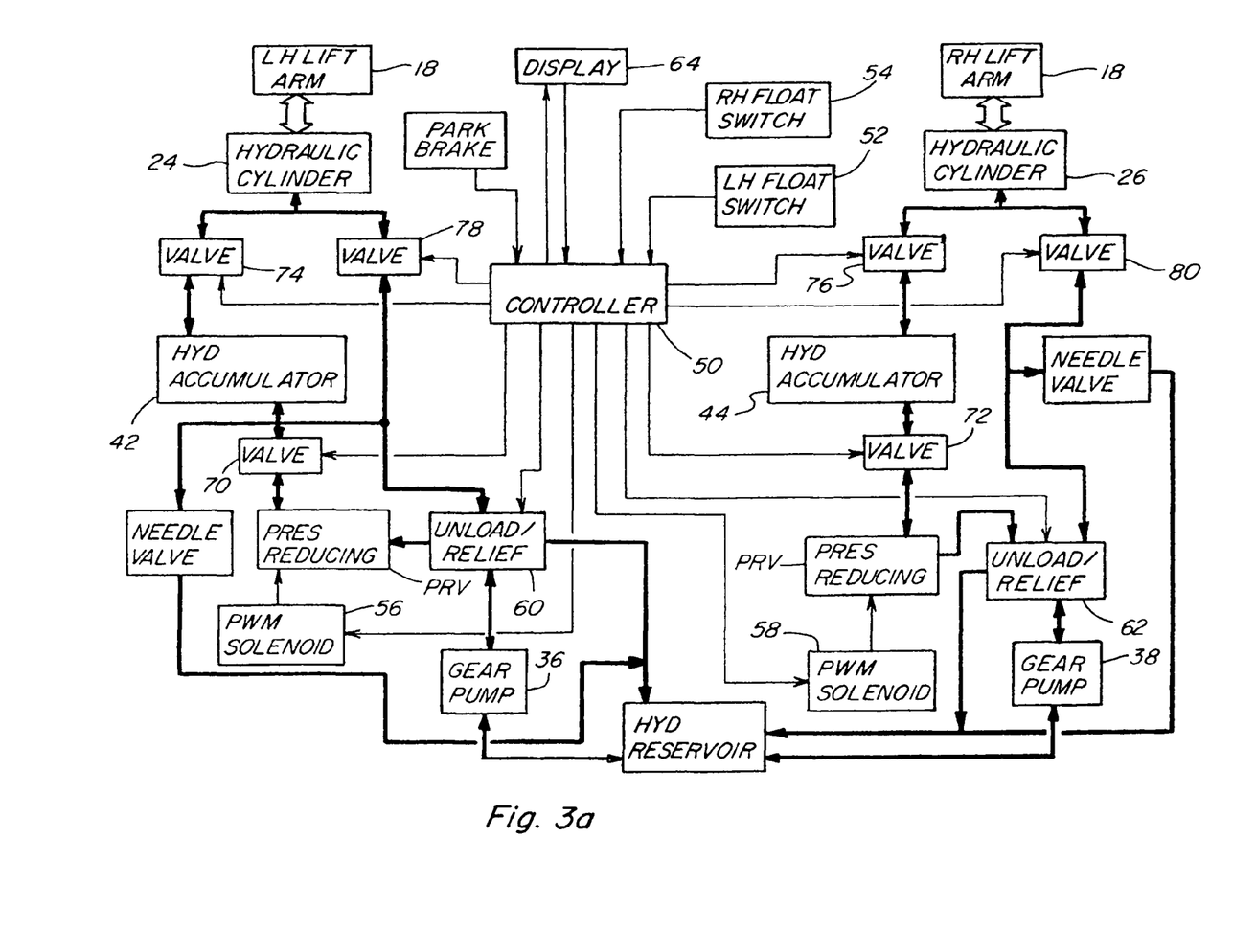

FIG. 3 provides a more detailed depiction of the complete control system and subsystems of the non-independent system. FIG. 3a does so for the independent system. Referring to FIG. 3a, and as also representative of FIG. 3, the left hand ("LH") and right hand ("RH") hydraulic systems, as shown also in FIG. 2a, additionally depict the electrical control and mechanical subsystems. Importantly, this figure depicts the multi-channel programmable controller 50 which exchanges electrical signals from the LH and RH float switches 52, 54, the PWM (pulse width modulated) solenoids 56, 58 which control the proportional pressure reducing valves PRV, the unload/relief valves 60, 62 (unload valves and relief valves illustrated separately in schematics), and other valves to manage the lift and flotation functions as established by the operator through the appropriate switches as shown on display 64.

In operation, each side of the header is supported by a single cylinder 24 or 26 that performs both the flotation and lift functions. In the independent system of FIGS. 2a and 3a, for even lifting and flotation of an unbalanced header, each cylinder has its own control valve, pump, and accumulator. The operator sets the desired flotation force by actuating rocker switches 52, 54 located on the operator's console. One switch position allows hydraulic oil to enter an accumulator (increasing the hydraulic pressure) which reduces the header contact force (flotation) with the ground. The other position allows oil to exit that accumulator (reducing the hydraulic pressure) which increases the header contact force with the ground. To evenly float unbalanced headers, there are separate switches to adjust each side independently. Once the flotation forces are set, the control valves will return to this preset flotation condition whenever the float mode is selected, irrespective of subsequent header lift and lower operations. The independent sub-systems 30 and 32 can also be operated independently or to different extents, to achieve a tilting of header 14 in either direction.

In the non-independent system of FIGS. 2 and 3, the operator sets the flotation force for both cylinders using single switch 52. A hydraulic counterweight capability for unbalanced conditions is provided by turning a manual control valve 66 to apply more weight (hydraulic pressure) to the light side of the header until the header raises and lowers to a level condition. If too much weight is applied, the operator simply turns the valve in the opposite direction. Once the correct setting is established, the hydraulic counterweight will not need to be readjusted during machine operation. Re-adjustment will only become necessary if the header builds up with debris or upon exchange with another header. For headers that experience severe changes in balance during normal operation, i.e., draper headers with deck-shift, an electro-hydraulic valve can be installed in place of the manual control valve. This electro-hydraulic valve is adjusted from a rocker switch on the operator's console. The operator then sets the hydraulic counterweight for each deck position. Once these values are established, the control valve will adjust automatically as the deck positions are selected.

Cylinders 24 and 26 are utilized for both raising and lowering header 14 relative to tractor 12 of windrower 10 and, in the instance of the independent system of FIGS. 2a and 3a, also for sidewardly tilting header 14 relative to tractor 12. For these purposes, the independent system of FIGS. 2a and 3a includes valves 70 and 72, controlled by solenoids B and F, respectively; valves 74 and 76, controlled by solenoids C and G, respectively; and valves 78 and 80, controlled by solenoids D and H, respectively. Solenoids B and F; C and G; and D and H, as well as PWM solenoids 56 and 58, are connected to controller 50 via suitable conductive paths, such as wires or the like, for receiving commands and/or operating signals therefrom.

Controller 50 can be programmed for managing subsystems 30 and 32, for automatically executing a variety of operating modes for the flotation and lift system, which can include, but are not limited to, a wake-up mode; a normal mode including float control; a charge accumulator mode; a transport mode; and a header remove mode, responsive to various inputs and or sensed conditions. As an illustrative example, controller 50 can be programmed to send programmed signals, in the form of electrical current of variable values, to PWM solenoids 56 and 58 which control the respective PRVs, which responsively control the amount of flotation force or pressure, as set by the operator using float switches 52 and 54, also referred to sometimes as trim switches. The PRVs are current controlled/regulated. Controller 50 is preferably of the type known as a micro-controller or an embedded controller unit (ECU). The accumulators replace traditional springs.

Operation is generally as follows:

raising header 14 through a first side or fluid path of the circuit extending between the source or sources of pressurized fluid (pumps 36 and 38) and the respective fluid cylinders 24 and 26, using solenoids D and H, respectively;

flotation is achieved through a second fluid path extending between the respective fluid cylinders 24 and 26 and respective accumulators 42 and 44, with flotation force setting easily adjusted with the press of switch 52 and/or switch 54 for changing conditions;

lowering header 14 is accomplished through a third fluid path including the PRV circuit and connecting with the respective pump 36 or 38, reservoir 40 and the second fluid path, using solenoids B, C and 56 of subsystem 30, and solenoids F, G and 58 of subsystem 32;

floatation settings can be remembered for a header that has varying lateral weight distribution and can be recalled immediately when a new lateral position is executed;

execute a charge accumulator cycle via the PRV circuit (second and third) fluid paths) at the first press of a header lower switch—variable with engine rpm.

At any time, header 14 can be raised by turning on of solenoids D and H for allowing pressurized hydraulic fluid flow from pumps 36 and 38 through valves 78 and 82 cylinders 24 and 26.

Once accumulators 42 and 44 are charged, a float mode is effected by turning on solenoids C and G, to allow fluid flow between cylinder 24 and accumulator 42, and between cylinder 26 and accumulator 44.

An observation regarding the gear pumps of the hydraulic systems discussed herein, which are contemplated to comprise commercially available gear pumps of well known construction, is that they are precisely made with only very small spaces for the passage or flow of fluid therethrough when not operating, and thus can be utilized to provide a vary restrictive fluid flow path. A potential advantage, as a result, is that a gear pump can be used when not operating as a throttling or metering device for gradually relieving a high pressure condition. Other pumps have also been found to also provide only a very restrictive fluid flow path therethrough when not operating, which other pumps include geroter pumps, vane pumps, and, in some instances, piston pumps, and thus may have utility for some applications. This restrictive flow capability has been found to have utility, particularly for hydraulic systems such as described herein, wherein one or more work elements, typically a fluid cylinder or cylinders, accumulators, connecting fluid lines and other elements of the system, contain pressurized fluid, and it is desired or required to gradually relieve the pressure, for instance, to reduce it to zero or a sufficiently low level such that it is safe to open the system without unacceptable risk of injury from fluid escaping the system, and/or from rapid lowering or crashing of raised work elements and/or loads carried thereby. This may arise, for instance, during a service procedure, wherein the harvester engine is turned off or inoperable, and it is necessary or desired to open the hydraulic system for inspection and/or repair. Also, at such time, the status of the pressure in all or some aspects of the hydraulic system may not be known, and, as part of a safety routine, it may be desirable to have a precautionary procedure for ensuring that a high pressure condition is not still present in the system. This procedure can be used alone, or with additional steps to ensure all pressure is relieved, such as opening other fluid paths of the system, such as through companion charge pump circuits or the like.

According to a preferred embodiment of the method of the invention, with the engine or other driving source of the gear pump or other flow restrictive pump or pumps not operating, the valve or valves controlling the fluid path or paths between the high pressure aspects of the hydraulic system or subsystem and the gear pump or other flow restrictive pump or pumps, are operated in a mode or manner to open those fluid paths, for at least a predetermined period of time sufficient for a quantity of fluid to drain through the gear pump or other flow restrictive pump or pumps, back to the low-pressure reservoir or tank, sufficient to relieve high pressures in the system or subsystem, and such that any raised work elements, and loads carried thereby, are lowered so as to be at the bottom of their range of travel, or otherwise supported, for instance on the ground, or other surface therebelow.

Referring more particularly FIGS. 2 and 3 showing non-independent subsystem 30, it will be assumed that lift cylinders 24 and 26 are in a raised position in support of the header. It will also be assumed that accumulator 42 is fully charged. Either of these conditions may or may not be true. With the engine driving gear pump 36 not operating, and no control signals outputted by controller 50 to the various solenoids it can be seen that unload/relief valve 60 can be in a mode open to reservoir 40, but fluid flow from cylinders 24 and 26, and accumulator 42, to valve 60 is variously prevented by lower and raise valves 70 and 78 controlled by solenoids B and D. One option, then, is to relieve pressure in cylinders 24 and 26, and accumulator 42, using the above explained routine for lowering header 14 through the PRV circuit, that is, by energizing solenoids B, C and 56, as explained above. However, as can also be seen, this will route the escaping fluid directly to reservoir 40. And, this does not meter or throttle the flow of the escaping fluid through gear pump 36, but instead would require operating solenoid 56 in a manner for allowing only a slow escape of the fluid.

Figure 4:
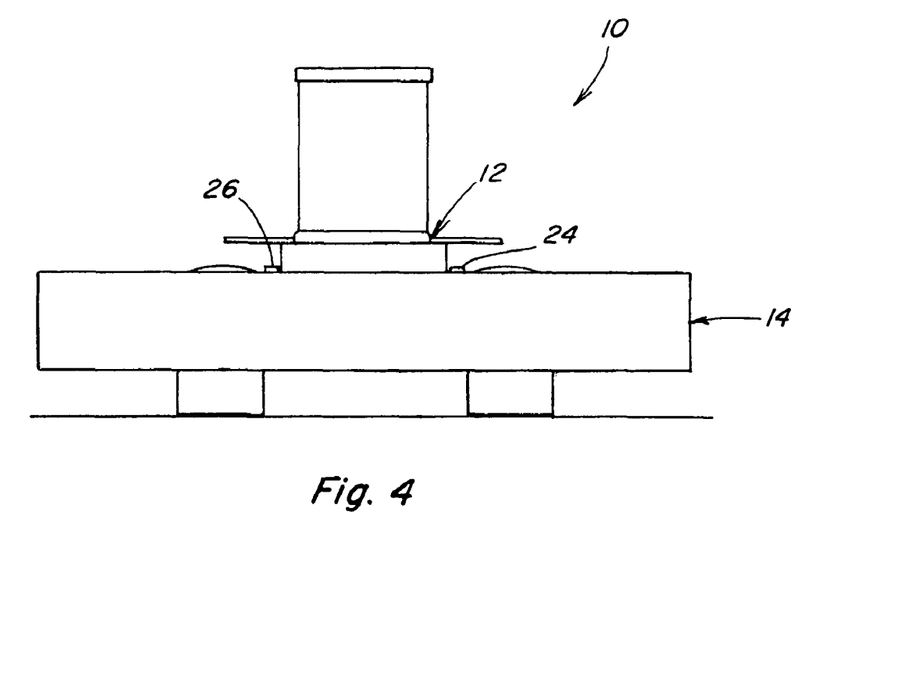
FIG. 4 is a front view of the harvesting machine of FIG. 1, with a header thereof in a raised position, as effected by pressurization of the hydraulic system thereof.
Figure 5:
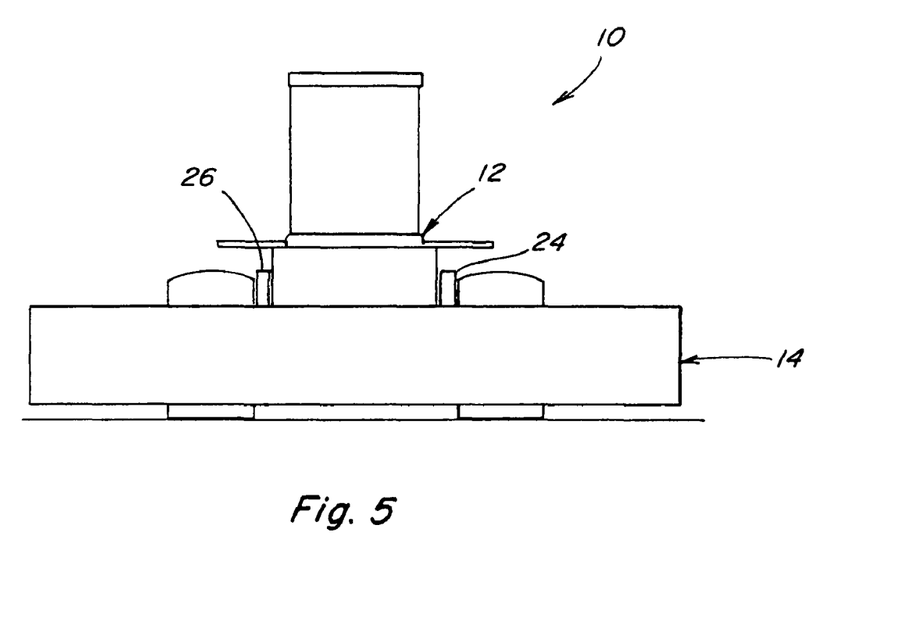
FIG. 5 is another front view of the harvesting machine of FIG. 1, with a header thereof in a lowered position, as effected by relieving the pressure in the hydraulic system according to the method of the invention.

As steps of one method according to the present invention, solenoid D controlling raise valve 78 will be energized to connect cylinders 24, 26, and accumulator 42, with gear pump 36, and the solenoid controlling valve 60 will be energized, to close the direct path to reservoir 40, such that the escaping fluid will be routed to reservoir 40 through gear pump 36, which will throttle or meter the flow. As an alternative or additional sequence, solenoids B and C controlling lower valve 70 and float valve 74 can be energized, along with the solenoid controlling valve 60, to direct the escaping fluid through the PRV circuit. Preferably, the energizing of these solenoids will be part of a predetermined pressure relieving routine that can be programmed into controller 50, the running of which can be initiated using a suitable input command, such as using touch screen display 64, for a time period determined to be sufficient for the gradual relieving of whatever pressurization may be present, and for slowly and safely lowering raised elements controlled by the system, particularly header 14, as illustrated by FIGS. 4 and 5. For instance, cylinders 24 and 26 have a fluid capacity that is measurable or otherwise determinable, and the predetermined time period can be calculated so as to be sufficient for an amount of fluid about equal to the capacities of the cylinders, and possibly also the accumulator or accumulators to drain through the gear pump or pumps, such that the cylinders and thus the lift arms and the header carried thereby will be at the bottom of their range of travel at the end of the predetermined time period.

Referring more particularly to FIGS. 2a and 3a, which illustrate the two independent subsystems 30 and 32, controller 50 can be programmed so as to be capable of executing the steps of the method of the invention for the two systems individually, or jointly. For subsystem 30, the steps will be as explained above, except that only cylinder 24 will be affected. For subsystem 32, solenoid H controlling raise valve 80 can be energized to connect cylinder 26 and accumulator 44, with gear pump 38, and the solenoid controlling valve 62 can be energized, to close the direct path to reservoir 40, such that the escaping fluid will be routed to reservoir 40 through gear pump 38, which will throttle or meter the flow. As another alternative, solenoids F and G controlling lower valve 72 and float valve 76 can be energized, along with the solenoid controlling valve 62, to direct the escaping fluid through the PRV circuit. Again, the energizing of the solenoids controlling these valves will be part of a predetermined pressure relieving routine that can be programmed into controller 50, the running of which can be initiated using a suitable input command, such as can be inputted in the well known manner using touch screen display 64, for a time period determined to be sufficient for the gradual relieving of a substantial portion of whatever pressurization may be present, and for slowly and safely lowering raised elements controlled by the system, particularly header 14. Most preferably, subsystems 30 and 32 are simultaneously depressurized, to provide even lowering of header, as illustrated by FIGS. 4 and 5.

Preferably also, the method of depressurizing the hydraulic subsystem or systems will be specially selectable, by an operator or service person, such that, during normal interruptions in operation, wherein engine 39 is typically turned off, the hydraulic systems will remain at least generally in the last state of pressurization before the engine was turned off, such that operation can be quickly resumed when the engine is restarted, such that waiting for a complete re-pressurization from zero is avoided.

Figure 6:
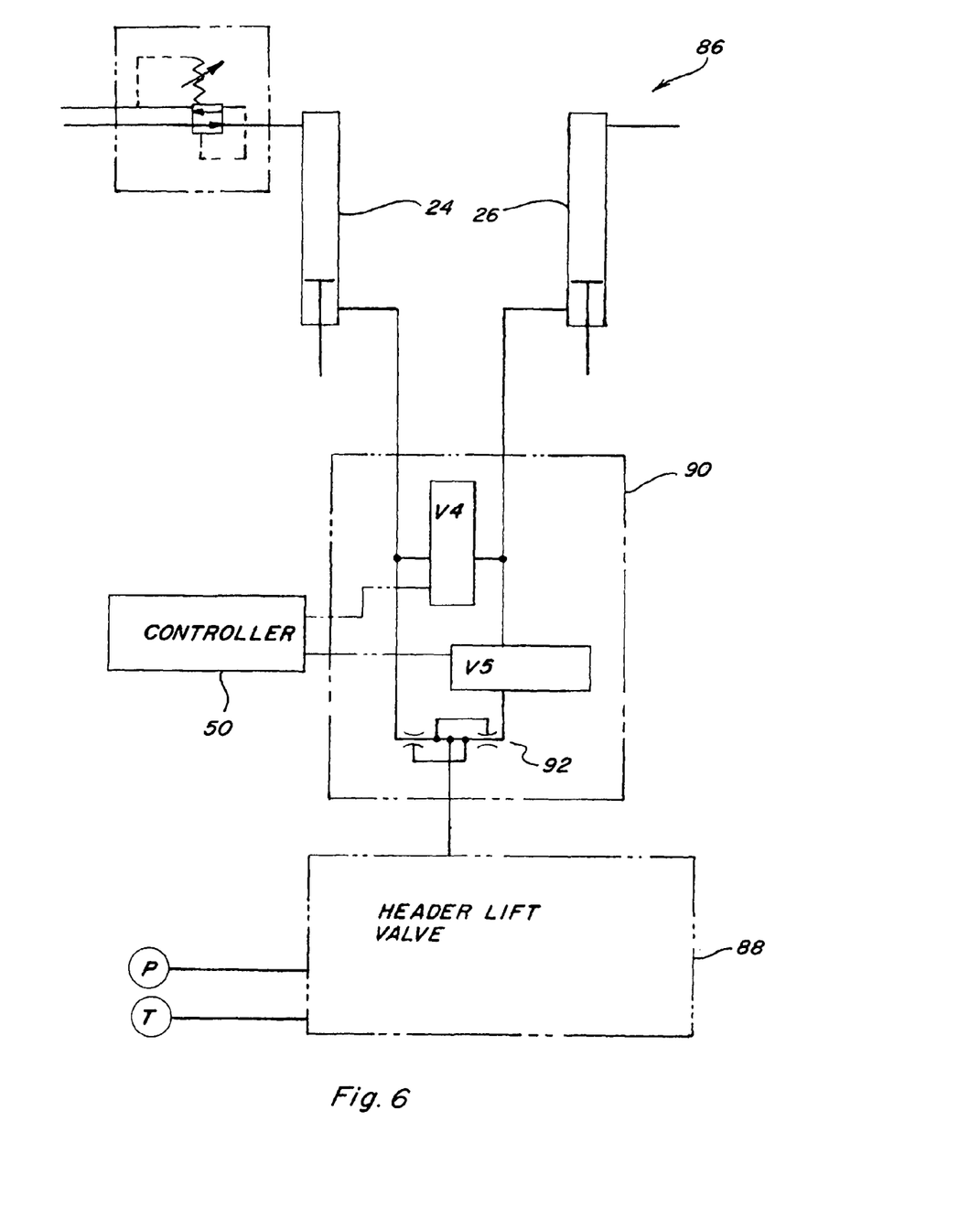
FIG. 6 is a hydraulic schematic view of another embodiment of a hydraulic system with which the instant invention can be used.

Referring also to FIG. 6, another hydraulic system 86, which is a height control circuit for controlling operation of fluid cylinders, such as cylinders 24 and 26 of a harvesting machine, such as harvesting machine 10 (FIG. 1), and with which the method of the invention for relieving pressure can be used, is shown. Hydraulic system 86 includes a pump P, which is representative of any of a variety of pumps which provide a highly restrictive fluid flow path therethrough when not operating, such as, but not limited to, a gear pump or geroter pump. System 86 is also in connection with a suitable reservoir or tank T. System 86 includes a header lift valve 88 controllably operable for directing pressurized fluid from pump P to a control valve and flow divider arrangement 90, including valves V4 and V5 controllable by a controller 50, for controllably directing the pressurized fluid to cylinders 24 and 26 in a desired manner. Valve 88 and arrangement 90 are also controllably operable for directing fluid from the cylinders to tank T, in a desired manner. A more complete description of the height control system 86 is contained in Ehrhart U.S. patent application Ser. No. 11/728,762, entitled Header Height Control System With Flow Divider Capability, filed Mar. 27, 2007, the disclosure of which is hereby incorporated herein by reference in its entirety. When a harvesting machine including system 86 is shutdown, such that pump P is not operating, and header lift valve 88 and valves V4 and V5 are not energized, these valves will be closed, to retain the position of cylinders 24 and 26. As a result, if the header supported by the valves is in a raised position, the cylinders and connecting lines will be highly pressurized.

At times, it will be desired or required to gradually relieve the pressure in system 86, for instance, to reduce it to zero or a sufficiently low level such that it is safe to open the system without unacceptable risk of injury from fluid escaping the system, and/or from rapid lowering or crashing of raised work elements and/or loads carried thereby, such as a header. As stated above, this may arise, for instance, during a service procedure, wherein the harvester engine is turned off or inoperable, and it is necessary or desired to open the hydraulic system for inspection and/or repair. Also, at such time, the status of the pressure in all or some aspects of the hydraulic system may not be known, and, as part of a safety routine, it may be desirable to have a precautionary procedure for ensuring that a high pressure condition is not still present in the system.

To accomplish a gradual pressure reduction in system 86, header lift valve 88 will be energized to connect arrangement 90 with pump P, and valves V4 and V5 will be energized to open. This will provide a fluid flow path from both cylinders 24, 26 to pump P, which fluid path will be opened for sufficient time to allow pressure to be relieved evenly from each of the cylinders through pump P. This procedure can be used alone, or with additional steps to ensure all pressure is relieved, such as opening other fluid paths of the system, such as through companion charge pump circuits or the like.

Figure 7:
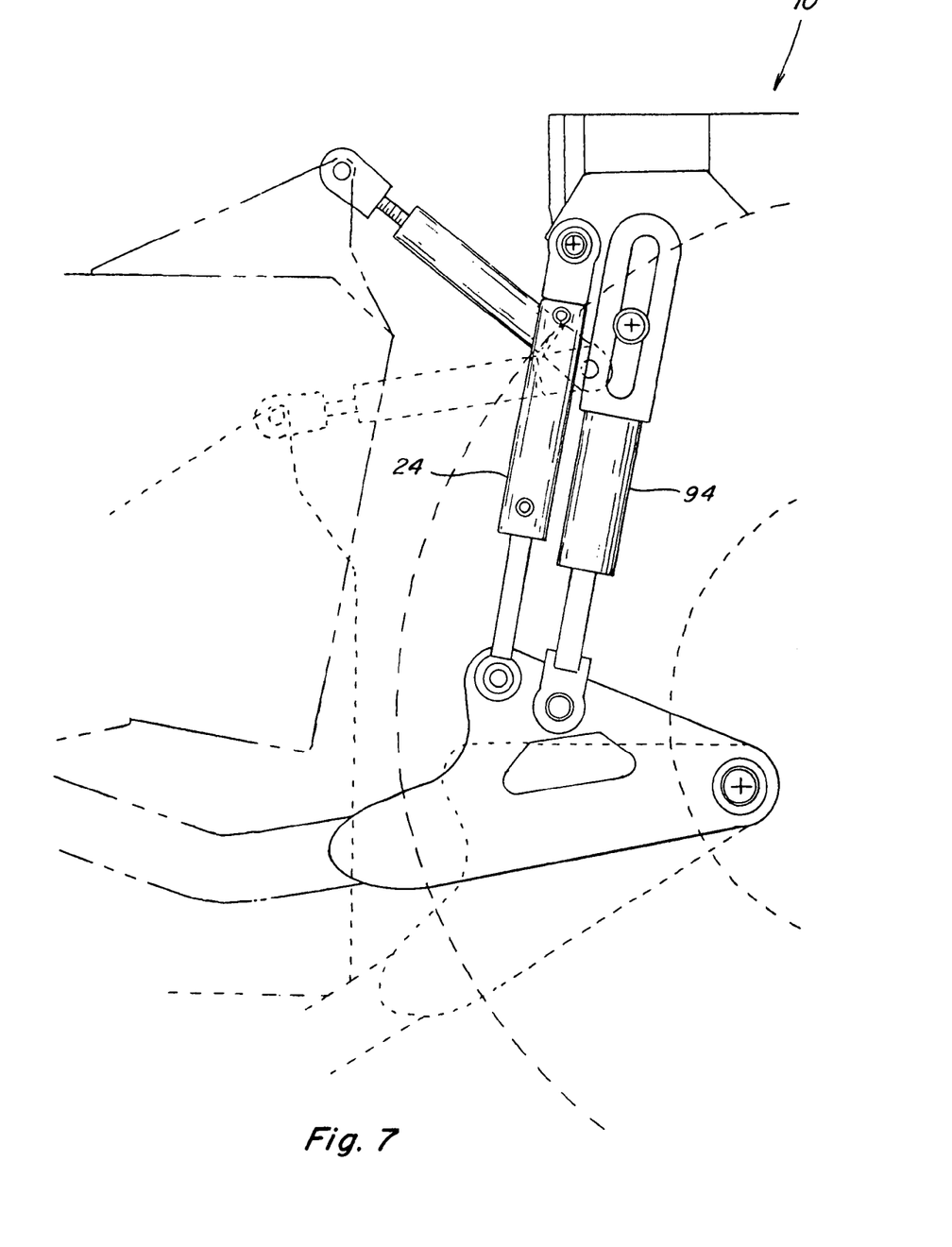
FIG. 7 is a side view of a harvesting machine similar to that of FIG. 1, including a height control cylinder of a height control system with which the instant invention can be used.
Figure 8:
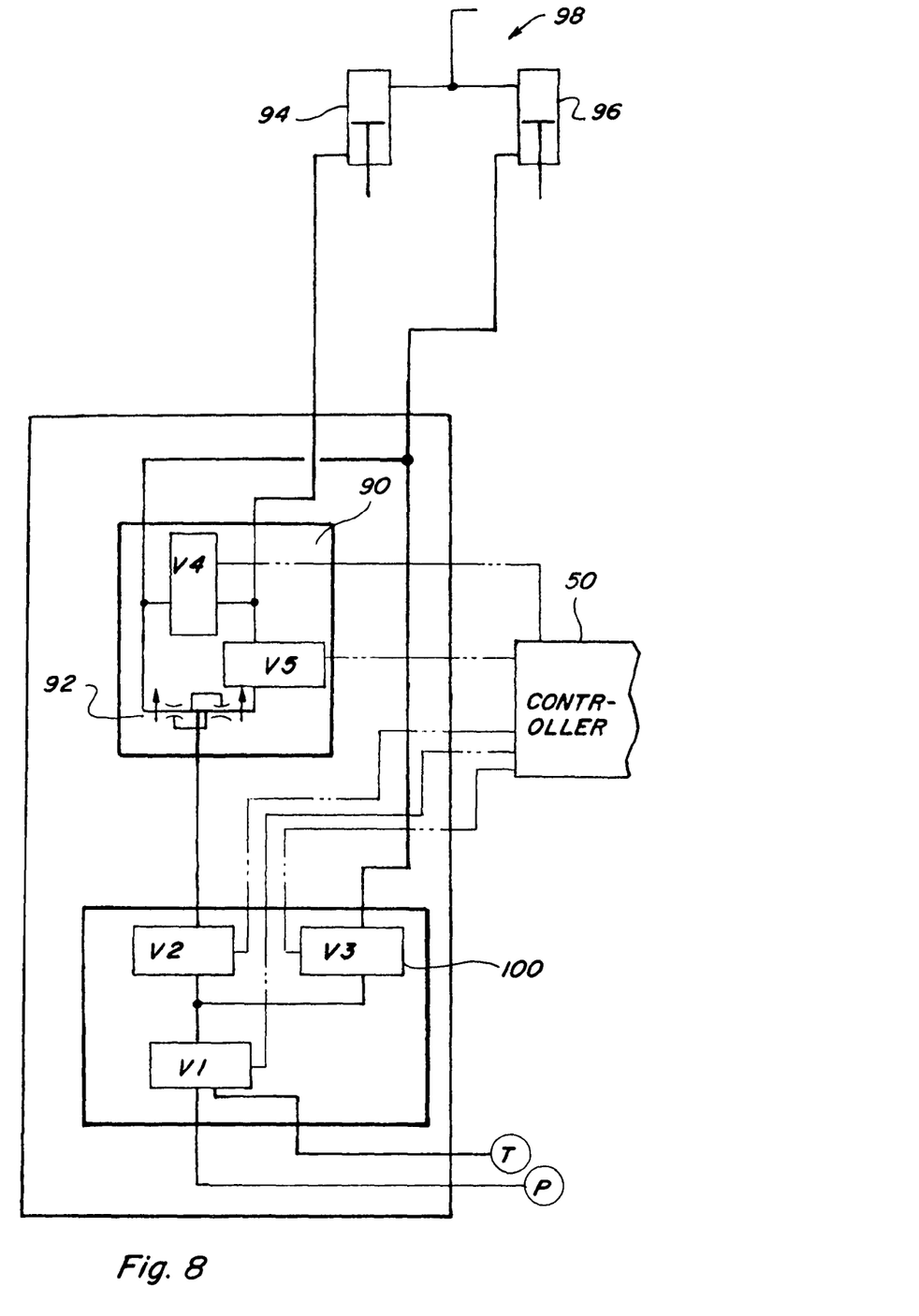
FIG. 8 is a schematic view of a height control system with which the instant invention can be used.

Referring also to FIG. 7 windrower 10 is illustrated as having a height control cylinder 94 in association with lift cylinder 26. Referring also to FIG. 8, height control cylinder 94, and another height control cylinder 96 on the opposite side of the machine, is part of a height control system 98, with which the method of the invention for relieving pressure, can be used. A more complete description of the height control system 98 is contained in Ehrhart U.S. patent application Ser. No. 11/728,762, entitled Header Height Control System With Flow Divider Capability, filed Mar. 27, 2007, the disclosure of which is hereby incorporated herein by reference in its entirety. Height control system 98, like system 86 just discussed, includes a control valve and flow divider arrangement 90 including a flow divider 92, controllably operable by a controller 50 in association with a height control valve arrangement 100, for providing an automatic height control capability. As with system 86 just discussed, when a windrower 10 including arrangement 90 is powered down, valves V4 and V5 will be closed when de-energized, as will valves V2 and V3, for preventing lowering of header supported thereby.

Again, at times, it will be desired or required to gradually relieve the pressure in system 98, for instance, to reduce it to zero or a sufficiently low level such that it is safe to open the system without unacceptable risk of injury from fluid escaping the system, and/or from rapid lowering or crashing of raised work elements and/or loads carried thereby, such as a header. As stated above, this may arise, for instance, during a service procedure, wherein the harvester engine is turned off or inoperable, and it is necessary or desired to open the hydraulic system for inspection and/or repair. Also, at such time, the status of the pressure in all or some aspects of the hydraulic system may not be known, and, as part of a safety routine, it may be desirable to have a precautionary procedure for ensuring that a high pressure condition is not still present in the system.

To accomplish a gradual pressure reduction in system 98, valves V1 and V2 of arrangement 100 will be energized so as to open and provide a flow path between pump P and control valve and flow divider arrangement 90, and valves V4 and V5 will be energized to open also, to complete a path to cylinder 94 and 96 through which pressurized fluid can be relatively evenly routed. Again, this will occur for a period of time sufficient for reducing the pressure to the desired extent, and this procedure can be used alone, or with additional steps to ensure all pressure is relieved, such as opening other fluid paths of the system, such as through companion charge pump circuits or the like.

It will be obvious to those skilled in the art that various changes may be made without departing from the scope of the invention and the invention is not to be considered limited to what illustrated in the drawings and described in the specification.

What is claimed is:

1. A method of relieving pressure in a hydraulic system, comprising steps of:
   providing a pump operable for pressurizing hydraulic fluid from a fluid reservoir and directing the pressurized fluid in a first direction through the hydraulic system including through at least one valve of the system, to at least one work element of the system comprising a hydraulic actuator operable by the pressurized fluid, wherein the pump is located in a fluid path between the reservoir and the work element, the hydraulic actuator configured to control the position of a component or implement of a work machine;
   the at least one valve being controllably operable by a controller in at least two operating modes, including a first mode wherein the pressurized fluid can pass therethrough for connecting the pump in fluid communication with the at least one work element, and a second mode wherein the fluid is prevented from passing between the pump and the at least one work element; and
   operating the controller to operate the at least one valve in the first mode for at least a predetermined time period when the pump is not operating, to allow pressurized fluid in the work element to drain in a second direction along the fluid path opposite the first direction through the pump to the reservoir so as to gradually reduce the pressure in the hydraulic system.

2. The method of claim 1, wherein the hydraulic system includes at least one additional valve controllably operable by the controller in a first mode for providing a fluid path between the hydraulic system and the reservoir, and in a second mode closing the path, and the step of operating the controller includes operating the at least one additional valve in the second mode closing the path during the predetermined time period when the first valve is open such that hydraulic fluid is directed from the work element through the pump to gradually drain to the reservoir.

3. The method of claim 2, wherein the step of operating the controller comprises simultaneously operating the valves automatically for at least the predetermined time period as part of a selectable routine.

4. The method of claim 1, wherein the hydraulic actuator comprises a fluid cylinder.

5. The method of claim 4, wherein the fluid cylinder has a predetermined fluid capacity, the pump is configured to allow only restricted fluid flow therethrough when not operating, and the predetermined time period is calculated to be sufficient for a quantity of the fluid about equal to the predetermined fluid capacity to drain from the cylinder through the pump.

6. The method of claim 4, wherein the work machine is an agricultural harvesting machine and the apparatus comprises a header of the harvesting machine, wherein placing the at least one valve in a first open mode gradually lowers the header.

7. The method of claim 6, wherein the at least one valve comprises a raise valve configured in the first mode for connecting the fluid cylinder in fluid communication with the pump for receiving flow in a first direction, the raise valve and pump configured such that when the pump is operating fluid can be displaced in a first direction from the reservoir to the fluid cylinder and when the pump is not operating fluid is directed in an opposite direction from the cylinder through the raise valve and the pump to the reservoir and a float valve in the first mode configured for connecting the fluid cylinder in fluid communication with an accumulator,
   placing the raise valve in the first mode and the float valve in the first mode when the pump is not operating such that fluid in the accumulator is directed toward the pump and reservoir and away and from the cylinder such that the header is gradually lowered.

8. The method of claim 6, wherein the at least one valve comprises a lower valve and a PRV valve, the lower valve in the first mode thereof configured for connecting the fluid cylinder in fluid communication with the PRV valve, and the PRV valve in the first mode thereof configured for connecting the lower valve in fluid communication with the pump, and the pump comprises a gear pump, wherein a fluid flow path is opened between the fluid cylinder and the gear pump through the lower valve and the PRV valve.

9. The method of claim 8, wherein the at least one work element additionally comprises an accumulator, and the at least one valve additionally comprises a float valve configured in the first mode thereof for connecting the fluid cylinder in fluid communication with the lower valve and the accumulator.

10. A method of gradually relieving pressure in a hydraulic system of a work machine, comprising steps of:
   providing a pump in fluid communication with the hydraulic system and a fluid reservoir, the pump being operable for pressurizing fluid from the reservoir and pumping the pressurized fluid into the hydraulic system, and the pump being restrictive to fluid flow therethrough when not operating, the hydraulic system including at least one valve in fluid communication with at least one work element configured for receiving the pressurized fluid, the at least one valve being controllably operable in at least two operating modes, including a first mode wherein the pressurized fluid can pass therethrough between the pump and the at least one work element, and a second mode wherein the fluid is prevented from passing between the pump and the at least one work element; and
   operating the at least one valve in the first mode for at least a predetermined time period while the pump is not operating, to allow at least some of any of the pressurized fluid in the at least one work element to flow through the hydraulic system and gradually drain through the pump to the reservoir so as to reduce any pressure in the hydraulic system and the at least one work element;
   wherein the hydraulic system comprises a lift system and the at least one work element comprises a fluid actuator operable for controlling the position of a component of the work machine.

11. The method of claim 10, wherein the pump comprises a gear pump.

12. The method of claim 11, wherein the fluid cylinder has a predetermined fluid capacity, and the predetermined time period is calculated to be sufficient for a quantity of the fluid about equal to the predetermined capacity quantity of fluid in the cylinder to drain through the gear pump towards the reservoir.

13. The method of claim 11, wherein the work machine is an agricultural harvesting machine and the apparatus comprises a header of the harvesting machine.

14. The method of claim 11, wherein the at least one valve comprises a raise valve operable when in the first mode thereof for connecting the fluid cylinder in fluid communication with the gear pump, and a float valve operable in the first mode thereof for connecting the fluid cylinder in fluid communication with an accumulator, wherein in a first mode a fluid flow path is opened between both the fluid cylinder and the accumulator to the reservoir through the gear pump.

15. The method of claim 11, wherein the at least one valve comprises a lower valve and a PRV valve, the lower valve in the first mode thereof configured for connecting the fluid cylinder in fluid communication with the PRV valve, and the PRV valve in the first mode thereof configured for connecting the lower valve in fluid communication with the gear pump, wherein a fluid flow path is opened between the fluid cylinder and the war pump through the lower valve and the PRV valve.

16. The method of claim 15, wherein the at least one work element additionally comprises an accumulator, and the at least one valve additionally comprises a float valve configured in the first mode thereof for connecting the fluid cylinder in fluid communication with the lower valve and the accumulator.

17. The method of claim 10, wherein the hydraulic system includes at least one additional valve configured in a first mode for providing a fluid return path between the hydraulic system and the reservoir, and in a second mode closing the fluid return path, and the step of operating the at least one valve includes operating the at least one additional valve in the second mode there for closing the fluid return path during the predetermined time period when the first valve is open such that hydraulic fluid is directed from the work element to pass through the pump to gradually drain to the reservoir.

18. The method of claim 17, wherein the step of operating the at least one valve comprises simultaneously operating the valves automatically for at least the predetermined time period as part of a selectable routine accessible when the engine is not operating.

19. The method of claim 10, comprising an additional step of providing a programmable controller connected in operative control of the at least one valve, and wherein the step of operating the at least one valve comprises inputting an input command to the controller to initiate the operation of the at least one valve in the first mode.

20. A hydraulic system of a work machine, comprising
   a rift system having at least one fluid actuator operable for controlling the position of a component of the work machine,
   a pump in fluid communication with the hydraulic system and a fluid reservoir, the pump being operable for pressurizing fluid from the reservoir and pumping the pressurized fluid into the hydraulic system, and the pump being restrictive to fluid flow therethrough when not operating;
   the hydraulic system including at least one valve in fluid communication with the at least one actuator configured for receiving the pressurized fluid, the at least one valve being controllably operable in at least two operating modes, including a first mode wherein the pressurized fluid can pass therethrough between the pump and the at least one actuator, and a second mode wherein the fluid is prevented from passing between the pump and the at least one actuator connected to the machine; and
   the controller configured to automatically operate the at least one valve in the first mode for at least a predetermined time period while the gear pump is not operating in response to an input command pressurized fluid in the actuator is directed to flow through the hydraulic system and gradually drain through the gear pump to the reservoir so as to reduce any pressure in the hydraulic system and the at least one actuator.

* * * * *